US008862453B2

(12) United States Patent
Hollis

(10) Patent No.: US 8,862,453 B2
(45) Date of Patent: Oct. 14, 2014

(54) TECHNIQUES FOR INCORPORATING TIMING JITTER AND/OR AMPLITUDE NOISE INTO HARDWARE DESCRIPTION LANGUAGE-BASED INPUT STIMULI

(75) Inventor: Timothy M. Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 1451 days.

(21) Appl. No.: 11/958,873

(22) Filed: Dec. 18, 2007

(65) Prior Publication Data

US 2009/0157376 A1 Jun. 18, 2009

(51) Int. Cl.
*G06F 17/50* (2006.01)
*G06F 9/455* (2006.01)

(52) U.S. Cl.
CPC ........ *G06F 17/5036* (2013.01); *G06F 2217/10* (2013.01); *G06F 17/5031* (2013.01); *G06F 2217/84* (2013.01)
USPC .............................. 703/14; 716/108; 716/115

(58) Field of Classification Search
CPC ............ G06F 17/5031; G06F 17/5036; G06F 2217/84
USPC ................................. 703/14; 716/6
See application file for complete search history.

(56) References Cited

U.S. PATENT DOCUMENTS

| | | | |
|---|---|---|---|
| 5,682,336 A | 10/1997 | Chian et al. | |
| 7,430,257 B1 | 9/2008 | Shattil | |
| 7,450,044 B2 | 11/2008 | Moore et al. | |
| 7,720,654 B2 | 5/2010 | Hollis | |
| 7,933,761 B2 | 4/2011 | Hollis | |
| 8,032,350 B2 | 10/2011 | Hollis | |
| 2003/0133423 A1 | 7/2003 | Ladue | |
| 2003/0231714 A1 | 12/2003 | Kjeldsen et al. | |
| 2004/0091055 A1 | 5/2004 | Williams | |
| 2005/0144580 A1* | 6/2005 | Berkram et al. | 716/6 |
| 2006/0200016 A1 | 9/2006 | Diab et al. | |
| 2007/0081609 A1* | 4/2007 | Albulet | 375/278 |
| 2007/0100596 A1 | 5/2007 | Hollis | |
| 2007/0264939 A1* | 11/2007 | Sugar | 455/67.11 |

OTHER PUBLICATIONS

Cadence, "Modeling and simuation of jitter in PLL frequency synthesizers", 2001.*
SynaptiCAD, "SynaptiCAD Tutorials", 2005.*

(Continued)

*Primary Examiner* — Thai Phan
*Assistant Examiner* — Angel Calle
(74) *Attorney, Agent, or Firm* — Schwegman Lundberg & Woessner, P.A.

(57) ABSTRACT

Methods for generating waveforms with realistic transitions, controllable timing jitter, and controllable amplitude noise in a computer-based simulation environment are disclosed. A first method includes obtaining signal information for one or more parallel data signals. In one embodiment, signal information for the one or more parallel data signals is mapped from an HDL format to a new time scale, and during this operation, timing jitter is added independently to the parallel data signals. These jittery parallel data signals may then be returned to the original HDL format, or another format, for simulation. In another embodiment, rather than mapping to a single time vector, information from each signal is modified to have a time scale commensurate with noise and jitter to be added. Timing jitter is superimposed onto each transition, rise and fall times are incorporated, and missing voltage and timing information for each data signal is interpolated into vectors representing the signals. Each data signal may additionally be scaled to one or more true voltage values and filtered. Finally, amplitude noise is added to each signal, and one or more final signals are output to a desired format for simulation.

5 Claims, 13 Drawing Sheets

40b

| Time1 43a (ps) | Jitter1 45a | IN1 41a | Time2 44a (ps) | Jitter2 46a | IN2 42a |
|---|---|---|---|---|---|
| 0 | 0 | 0 | 0 | 0 | 0 |
| 1000 | -3.2 | 1 | 1000 | 0 | 0 |
| 1500 | 0 | 1 | 1500 | 1 | 1 |
| 1700 | -2 | 0 | 1700 | 0 | 1 |

40c

| Time1 43b (ps) | IN1 41b | Time2 44b (ps) | IN2 42b |
|---|---|---|---|
| 0 | 0 | 0 | 0 |
| 996.8 | 1 | 1501 | 1 |
| 1698 | 0 | | |

(56) References Cited

OTHER PUBLICATIONS

Donna Mitchell, NPL, "Test bench generation from timing diagrams", 1996.*
Tektronix, NPL, "XYZs of signal generators", Mar. 7, 2007 (Google).*
Tektronix, NPL, "XYZs of signal sources", Aug. 23, 2003 (Google).*
J. Buckwalter, et al., "Predicting data-Dependent Jitter," IEEE Transactions on Circuits and Systems-II: Express Briefs, vol. 51, No. 9, Sep. 2004, pp. 453-457.
HSPICE Simulation and Analysis User Guide, Synopsis, Inc., Mar. 2007, pp. 205-208.
*SynaptiCAD's Waveformer Pro imports and exports waveform data*, Synapticad, 2007, http://www.syncad.com/syn_perl.htm.
"Clock Source with Random Jitter", HSPICE RF User Guide Z, (2007), 113-116.
"Controlled Jitter Generation for Jitter Tolerance and Jitter Transfer Testing", Tektronix, Appl. Note 61W-18431-3, (2005), 16 pgs.
"Documentation for ClockWjitter (Voltage Source: Clock with Jitter) for Agilent Technologies", Advanced Design System (ADS)TM, (Oct. 8, 2007), 2 pgs.
"Documentation for PRBSsrc (Psuedo-Random Bit Sequence Source) for Agilent Technologies' Advanced Design System (ADS)TM", (Oct. 8, 2007), 10 pgs.
"Documentation for SynaptiCAD's WaveformerTM module", [Online]. Retrieved from internet: <http://www.syncad.comlsyn_time_analysis.htm#clock>, (Oct. 8, 2007), 6 pgs.
"Fast Fourier Transform", Wikipedia, [Online]. Retrieved from the Internet: <http://en.wikipedia.org/wiki/Fast_Fourier_transform>, (Publication Date Unknown), 9 pgs.
"Fast Fourier Transform (FFT)", [Online]. Retrieved from the internet: <http://www.cmlab.csie.ntu.edu.tw/cml/dsp/training/coding/transform/fft.html>, (Publication Date Unknown), 17 pgs.
"Guide to Harmonic Balance Simulation in ADS", Agilent Technologies, 1998-2004, (Sep. 2004), 72 pgs.
Austin, M E, et al., "Decision-Feedback Equalization for Digital Communication Over Dispersive Channels", Massechusetts Institute of Technology: Research Laboratory of Electronics, Technical Report 461, (Aug. 11, 1967), 102 pgs.
Balamurugan, G, et al., "Modeling and Mitigation of Jitter in Multi-Gbps Source-Synchronous I/O Links", Proceedings of the 21st International Conference on Computer Design. IEEE, (Oct. 2003), 254-260.
Becker, F K, et al., "Automatic Equalization for Digital Communication", Proceedings of the IEEE, vol. 53, (Jan. 1965), 96-97.
Bergmans, J M, "Decision Feedback Equalization for Digital Magnetic Recording Systems", IEEE Transactions on Magnetics vol. 24, No. 1, (Jan. 1988), 683-688.
Berners, Dave, "Ask the Doctors: Resampling Issues", [Online]. Retrieved from the Internet: <URL: http://www.uaudio.com/webzine/2005/september/text/content2.html>, (Sep. 2005, [retrieved on Dec. 11, 2009]), 6 pgs.
Casper, B K, et al., "An accurate and Efficient Analysis Method for Multi-Gb/s Chip-to-Chip Signaling Schemes", 2002 Symposium on VLSI Circuits Digest of Technical Papers, (2002), 54-57.
Hanumolu, P K, et al., "Analysis of PLL Clock Jitter in High-Speed Serial Links", IEEE Transactions on Circuits and Systems-II: Analog and Digital Signal Processing, vol. 50, No. 11, (Nov. 2003), 879-886.
Hayes, M H, "Statistical Digital Signal Processing and Modeling", 1st ed. New York: John Wiley & Sons, Inc., 1996, (1996), p. 20.
Hollis, T M, et al., "Reduction of Duty Cycle Distortion through Bandpass Filtering", PhD Research in Microelectronics and Electronics, Jul. 25, (2005), 263-266.
Holzlohner, R, et al., "Accurate Calculation of Eye Diagrams and Bit Error Rates in optical Transmission Systems Using Linearization", IEEE Journal of Lightwave Technology, vol. 20, No. 3, (Mar. 2002), 389-400.
Johnson, Don, "Fast Fourier Transform (FFT)", Version 2.14, [Online]. Retrieved from the Internet: <http://cnx.org/content/ml0250/latest/>, (Apr. 2005), 4 pgs.
Jokinen, H, et al., "Steady-State Time-Domain Analysis Including Frequency-Dependent Components", [Online]. Retrieved from the Internet: <http://www.aplac.hut.fi/publications/ct-24/ct-24.pdf>, (Jun. 1995), 22 pgs.
Kim, K. K, et al., "On the modeling and analysis of jitter in ATE using Matlab", In Proceedings of the IEEE International Symposium on Defect and Fault Tolerance in VLSI Systems, (Oct. 2005), 285-293.
Lathi, B P, "5.3: The Fast Fourier Transform (FFT)", Signal Processing & Linear Systems, Berkeley Cambridge Press, Carmichael, CA, (1998), 352-357.
McCorquodale, et al., "Study and Simulation of CMOS LC Oscillator Phase Noise and Jitter", Proceedings of the 2003 International Symposium on Circuits and Systems, [Online]. Retrieved from the Internet: <URL: http://web.eecs.umich.edu/~mmccorq/publications/mccorquodaleISCAS03.pdf>, (2003), I-665-I-668.
Sanders, A, et al., "Channel compliance testing utilizing novel statistical eye methodology", in Proceedings of Design-Con 2004. International Engineering Consortium, (Feb. 2004), 25 pgs.
Sifri, J, et al., "RF Design Environment Closes Verification Gap", Microwaves & RF: Trusted Resource for the Working RF Engineer, [Online]. Retrieved from the Internet: <http://www.mwrf.com/Articles/Index.cfm?ArticleID~6854>, (Nov. 2003), 9 pgs.
Song, E, et al., "Data Dependent Jitter Estimation Using Single Pulse Analysis Method", 2005 Electronics Packaging Technology Conference, (Dec. 2005), 810-813.
Tabatabaei, et al., "Jitter generation and measurement for test of multi-Gbps serial IO", In Proceedings of the ITC International Test Conference, (Oct. 2004), 1313-1321.
Telichevesky, R, et al., "Receiver Characterization Using Periodic Small-Signal Analysis", IEEE Custom Integrated Circuits Conference, (1996), 449-452.

* cited by examiner

30b

| Time1<br>33b (ps) | Jitter1<br>35a | IN1<br>31b | Time2<br>34a (ps) | Jitter2<br>36a | IN2<br>32b |
|---|---|---|---|---|---|
| 0 | 0 | 0 | 0 | 0 | 0 |
| 1000 | -3.2 | 1 | 1000 | 0 | 0 |
| 1500 | 0 | 1 | 1500 | 1 | 1 |
| 1700 | -2 | 0 | 1700 | 0 | 1 |

30c

| Time<br>33c (ps) | IN1<br>31c | IN2<br>32c |
|---|---|---|
| 0 | 0 | 0 |
| 996.8 | 1 | 0 |
| 1501 | 1 | 1 |
| 1698 | 0 | 1 |

50a

```
'timescale 100fs
module stimulus(IN1, IN2);
  output IN1;
  output IN2;

// Sequence
initial
  begin
    IN1 <= 1'b0;
    IN2 <= 1'b0;
    #9968;
    IN1 <= 1'b1;
    #5042;
    IN2 <= 1'b1;
    #1970;
    IN1 <= 1'b0;
  end endmodule
```

40b

| Time1<br>43a (ps) | Jitter1<br>45a | IN1<br>41a | Time2<br>44a (ps) | Jitter2<br>46a | IN2<br>42a |
|---|---|---|---|---|---|
| 0 | 0 | 0 | 0 | 0 | 0 |
| 1000 | -3.2 | 1 | 1000 | 0 | 0 |
| 1500 | 0 | 1 | 1500 | 1 | 1 |
| 1700 | -2 | 0 | 1700 | 0 | 1 |

| Time1<br>43b (ps) | IN1<br>41b | Time2<br>44b (ps) | IN2<br>42b |
|---|---|---|---|
| 0 | 0 | 0 | 0 |
| 996.8 | 1 | 1501 | 1 |
| 1698 | 0 | | |

*Figure 4C*

$$Vt\ 47a = \begin{bmatrix} 0.0 \\ 0 \\ 0 \\ 996.8 \\ 0 \\ 0 \\ 1698.0 \\ 0 \end{bmatrix} (ns) \quad W1\ 48a = \begin{bmatrix} 0.5 \\ 0.0 \\ 0.0 \\ 0.5 \\ 0.0 \\ 0.0 \\ 0.5 \\ 0.0 \end{bmatrix} (V)$$

$$Vt\ 47b = \begin{bmatrix} 0.0 \\ 0 \\ 0 \\ 996.8 \\ 0 \\ 0 \\ 1698.0 \\ 0 \end{bmatrix} \text{(ps)} \qquad W1\ 48b = \begin{bmatrix} 0.5 \\ 0.0 \\ 0.0 \\ 0.5 \\ 1.0 \\ 1.0 \\ 0.5 \\ 0.0 \end{bmatrix} \text{(V)}$$

37a, 37b, 37c, 37d, 37e, 37f $$Vt\ 47c = \begin{bmatrix} 0.0 \\ 15.0 \\ 981.8 \\ 996.8 \\ 1011.8 \\ 1683.0 \\ 1698.0 \\ 1713.0 \end{bmatrix} (ps) \quad W1\ 48c = \begin{bmatrix} 0.5 \\ 0.0 \\ 0.0 \\ 0.5 \\ 1.0 \\ 1.0 \\ 0.5 \\ 0.0 \end{bmatrix} (V)$$

Vin0 d1 0 PWL(0.000000e+000 0.501000e-001

TECHNIQUES FOR INCORPORATING TIMING JITTER AND/OR AMPLITUDE NOISE INTO HARDWARE DESCRIPTION LANGUAGE-BASED INPUT STIMULI

CROSS-REFERENCE TO RELATED APPLICATION

This application is based on U.S. patent application Ser. No. 11/549,646 filed Oct. 14, 2006, and Ser. No. 11/926,682 filed Oct. 29, 2007, the contents of which are incorporated herein by reference.

FIELD OF THE INVENTION

Embodiments of this invention relate to improved methods for simulating signals in a computerized simulation environment, and in particular for improving the modeling of amplitude noise and timing jitter in the signals being simulated.

BACKGROUND

Circuit designers of multi-Gigabit systems face a number of challenges as advances in technology mandate increased performance in high-speed components. For example, chip-to-chip data rates have traditionally been constrained by the bandwidth of input/output (I/O) circuitry in each component. However, process enhancements (e.g., transistor bandwidth) and innovations in I/O circuitry have forced designers to also consider the effects of the transmission channels between the chips on which data is sent.

At a basic level, data transmission between components within a single semiconductor device or between two devices on a printed circuit board may be represented by the system 10 shown in FIG. 1A. In FIG. 1A, a transmitter 12 (e.g., a microprocessor) sends data over channel 16 (e.g., a copper trace on a printed circuit board or "on-chip" in a semiconductor device) to a receiver 14 (e.g., another processor or memory). When data is sent from an ideal transmitter 12 to a receiver 14 across an ideal (lossless) channel 16, all of the energy in a transmitted pulse will be contained within a single unit interval (UI).

However, real transmitters and real transmission channels do not exhibit ideal characteristics, and as mentioned above, the effects of transmission channels are becoming increasingly important in high-speed circuit design. Due to a number of factors, including, for example, the limited conductivity of copper traces, the dielectric medium of the printed circuit board (PCB), and the discontinuities introduced by vias, the initially well-defined digital pulse will tend to spread or disperse as it passes through the channel 16. This is shown in FIG. 1B. As shown, a single pulse of data 15a is sent by the transmitter 12 during a given UI (e.g., UI3). However, because of the effect of the channel 16, this data pulse 15b becomes spread over multiple UIs at the receiver 14, i.e., some portion of the energy of the pulse is observed outside of the UI in which the pulse was sent (e.g., in UI2 and UI4). This residual energy outside of the UI of interest may perturb a pulse otherwise occupying the neighboring UIs, in a phenomenon referred to as intersymbol interference (ISI).

Because of the potentially negative impact of ISI on the reliability of data transfer and detection at the receiver 14, such data transfer is often simulated in a computer system using simulation software. The design of a high-speed system 10 typically involves iterations of circuit-level simulation to ascertain whether or not the system 10 has performed error free communication, and this of course requires a waveform suitable for simulation in simulation software. Simulation is a valuable tool in the semiconductor industry, where it is generally very expensive to design and produce a given integrated circuit. The use of simulation software allows the circuit designer to verify the operation and margins of a circuit design before incurring the expense of actually building and testing the circuit. Through the use of simulations, design errors or risks are hopefully identified early in the design process, and resolved prior to fabrication. Unfortunately, modeling and simulation of realistic waveforms suitable to accurately reflect the characteristics of a signal is difficult. It is generally necessary to define a waveform in a layout simulator such as SPICE™. This requires transistors, resistors, and other discrete components to be electronically considered, even if they are not actually yet constructed or laid out. Such component-level consideration takes considerable time and effort.

One standard application for simulating systems and signals is Verilog. Verilog is a hardware description language (HDL) used to describe electronic systems and the signals that propagate in such systems, at various levels of abstraction. A common use for Verilog in relationship to circuit-level simulation involves the use of piecewise-linear (PWL) signals to represent various signals. PWL signals in Verilog hold a value for a given time before changing to a new value. One or more PWL signals in Verilog are represented by a single vector file, which contains necessary timing information for each signal contained in the vector file. Verilog, like other HDLs, is designed to stress digital circuits. Accordingly, Verilog PWL signals typically represent several parallel signals, which may include instructions, memory addresses, random data, etc. Typically the instructions and memory address signals are limited by the permissible instruction set or valid address space.

There are at least two reasons for simulating so many signals simultaneously. First, the state machine that controls the operation of the integrated circuit may require several inputs to function. Second, in many instances it is important to verify the relative timing of such signals, particularly when the possibility of race conditions exists. The term race condition refers to a situation where multiple digital signals must arrive at a point in the circuit with a specific timing relationship (e.g. a particular order of arrival). Race conditions become problematic when signal propagation along different paths results in the violation of the required timing, and hence circuit malfunction. Because HDL input is often idealized, the only factors usually considered when looking for race conditions are the propagation delays through the various circuits and interconnects. Thus, the effects of random timing variations (e.g., jitter), are usually not considered. While it is possible to manually offset the timing of the various input signals to approximate jitter, no method has been introduced for translating HDL input into a data set exhibiting realistic, statistically defined jitter.

FIG. 2A shows a table 18 containing time and voltage values (i.e., signal information) for forming two separate, parallel PWL data signals IN1 21a and IN2 22a. As seen in FIG. 2A, only the times of transitions and the corresponding logic values following the transitions (i.e., '0' and '1'), are included in the table. One skilled in the art will appreciate, of course, that other information, such as a rise time or a fall time for signal transitions may also be present, and that all signal information (i.e., for both data signals) is typically encoded in a single vector file that is interpretable by Verilog. In other words, a "master" rise or fall time may be designated for a signal, such that the rise or fall time is incorporated into each signal transition.

To summarize, at 0 nanoseconds, each of the data signals IN1 21a and IN2 22a begins at a logic value of '0.' At 1.0 nanoseconds, the first data signal IN1 21a transitions from a logic value of '0' to '1,' while the other data signal IN2 22a remains at a logic value of '0,' which is inferred by the fact that the reported voltage does not change. At 1.5 nanoseconds, data signal IN2 22a transitions from a logic value of '0' to '1,' while IN1 21a remains at a logic value of '1' Finally, at 1.7 nanoseconds, data signal IN1 21a transitions from a logic value of '1' back to '0,' while IN2 22a remains at a logic value of '1.' Such data signals IN1 21a and IN2 22a may be used, for example, as command signals in a simulated microprocessor. A graph corresponding to each of the aforementioned data signals is shown in FIG. 2B. As can be seen in FIG. 2B, the PWL data signals represented by the table in FIG. 2A can form two distinct data signals, and, as expected, a transition for each of these data signals occurs at the ideal time indicated by the times shown in the table of FIG. 2A. The logic values shown in FIG. 2A may be inferred as logic or voltage values by the program that interprets the sparse PWL voltage versus timing information shown in FIG. 2A, depending on the availability of such voltage reference information with the sparse PWL voltage versus timing information. In other words, as should be understood, the logic values of '0' and '1' refer to high and low reference voltages for the signals.

One concern among system designers is that modeling and simulation using such signals may not provide a suitably accurate picture of how the system 10 will process real signals. Realistic data signals are not ideal, but instead suffer from various sources of amplitude noise and timing jitter, which may vary randomly between the bits of data. Regardless of the source or type of amplitude noise or timing jitter, it is difficult to quickly and efficiently simulate the effects of amplitude noise and timing jitter in the context of a system 10, which is especially problematic.

The challenge associated with simulating channel-affected signals is highly correlated to the characteristics of the degradation affecting the channel. Signals in any transmission medium experience both random and deterministic degradation. Random degradation, in the form of random Gaussian distributed amplitude noise and timing jitter, which stem from thermal and shot noise, requires statistical quantification. Similarly, deterministic amplitude noise and timing jitter are linked to several sources including power supply noise, inter-channel crosstalk, impedance discontinuities, component variance, and at high frequencies the response of the channel. These factors result in a variety of observable characteristics, from periodicity to uncorrelated-bounded randomness. To model these noise components correctly requires the ability to designate their probability during the noise generation stage and consequently inject or superimpose these effects onto the underlying signal in a way reflecting what occurs in the actual system. The final success or robustness of a particular design is dependent, to a large measure, on the achieved realism of the simulation environment.

To date, industry standard simulators do not provide the level of amplitude noise and timing jitter generation control necessary to model a realistic communication channel, though some jitter adding features have recently become available. Agilent's Advanced Design System (ADS) tool, Synopsys's Hspice, and Synapticad's WaveformerPRO all offer stock waveforms with additive jitter, but the features are limited in several ways. For example, in the cases of ADS and Hspice, the jitter exhibited by the waveform may take on one of a few standard forms: it may either exhibit a Gaussian probability distribution or a periodic jitter distribution (e.g. sinusoidal distribution, etc.), but combinations of random and periodic jitter distributions are limited both in terms of the number of permitted jitter sources per signal and the peak magnitude of the jitter. In addition, there is no clear mechanism for adding amplitude noise in the time-domain. WaveformerPRO permits even fewer options, allowing the user to define a peak-to-peak jitter value, but offering no control over the statistical characteristics of the jitter. While all three tools provide jittery clock sources, only Agilent's tool allows for jitter to be added to random data sequences. While random data may be manually altered by the user, the length of a user defined sequence is limited to $(2^{32}-1)$ bits. Thus, while one can find clock and random data sources exhibiting a limited selection of jitter characteristics, a tool has yet to be developed to produce simulatable waveforms of arbitrary data patterns and of arbitrary length, exhibiting arbitrary timing jitter and amplitude noise characteristics.

Another challenge in simulating realistic signaling environments is tied to the underlying statistical assumption that sufficient samples of the behavior to be characterized are readily available. As such, it is becoming necessary to include more and more cycles with each simulation. As the relative size of each individual noise component is very small with respect to the overall cycle period, fine voltage and timing resolution are necessary. While the timing resolution of a simulation may be enhanced by decreasing the time span between each calculation (i.e., the simulated time step), this leads to a simultaneous increase in both the simulation run time and the memory requirement. When fine simulation resolution is coupled with a greater number of simulated cycles, the result is an enormous amount of data and prohibitively lengthy simulation times. It is not uncommon for transistor-level transient (time-based) simulations to run for hours or even days. It is likewise not uncommon for such a simulation to fail due to a lack of memory resources.

In addition to the requirement of picosecond timing resolution, the statistical nature of random amplitude noise and timing jitter demand that the signal-system interaction be computed over several clock cycles in order to provide the necessarily large number of samples required to properly build up probability distributions. Coupling the constraints of high resolution (small transient time step) with the need to observe the behavior over thousands or millions of cycles extends the transistor-level simulation run time and memory requirements even further.

While unbounded Gaussian noise and jitter lead to long term bit errors, depending upon the bandwidth of the channel, ISI and the corresponding data-dependent jitter (DDJ) may dominate the short term signal degradation. Methods have been proposed for predicting the DDJ distribution from the relationship of the data-rate and the channel bandwidth.

With the following background in hand, it should be apparent that an improved signal simulation technique would at least allow for the simulation of various kinds of and lengths of signals, with good computational efficiency, and allow for the formation of a signal for simulation in which amplitude noise and timing jitter of any resolution are easily and realistically modeled. The disclosed techniques achieve such results in a manner easily implemented in a typical computerized system or other computerized circuit simulation software package.

BRIEF DESCRIPTION OF THE DRAWINGS

Embodiments of the present invention will be best understood with reference to the following detailed description, when read in conjunction with the accompanying drawings, in which:

FIG. 4B illustrates time and voltage values for PWL functions of FIG. 4A, as well as jitter values by which the time and voltage values are modified.

FIG. 4C illustrates time and voltage values for the PWL functions of FIG. 4B pursuant to one or more embodiments of the invention.

FIG. 4D illustrates upscaled versions of the jittered transition voltage vector and its associated jittered transition timing vector.

FIG. 4G illustrates modification of the upscaled jittered transition timing vector to correct the timing of the corners in light of the rise and fall times of the bit sequence.

FIG. 4K illustrates a simulator-compatible analog vector in accordance with one or more embodiments of the invention

DETAILED DESCRIPTION

Methods for generating waveforms with realistic transitions, controllable timing jitter, and controllable amplitude noise in a computer-based simulation environment are disclosed. The voltage and timing precision of the signals generated by the disclosed techniques is constrained only by the numerical limitations of the underlying computational tool. Briefly, the methods include obtaining signal information for one or more parallel data signals. In one embodiment, signal information for the one or more parallel data signals is mapped from an HDL format to a new time scale, and during this operation, timing jitter is added independently to the parallel data signals. These jittery parallel data signals may then be returned to the original HDL format, or another format, for simulation.

In another embodiment, rather than mapping to a single time vector, information from each signal is modified to have a time scale commensurate with the noise and jitter to be added. Timing jitter is superimposed onto each transition, rise and fall times are incorporated, and missing voltage and timing information for each data signal is interpolated into vectors representing the signals. Each data signal may additionally be scaled to one or more true voltage values for the signal, and filtered to approximate the bandwidth limitations of a real system. Finally, amplitude noise is added to each signal, and one or more final signals are output to a desired format for simulation.

While PWL voltage versus timing information is useful for certain applications, to manipulate the signal information contained therein, it may be necessary to first convert the data from the PWL representation to another format suitable for manipulation of the data. For example, the PWL voltage versus timing information may be converted from an input vector to a vector or matrix format (such as that used within e.g., Matlab or Excel), for performing various operations on the voltage versus timing information. This is shown in FIG. 3A.

Figure 1A:
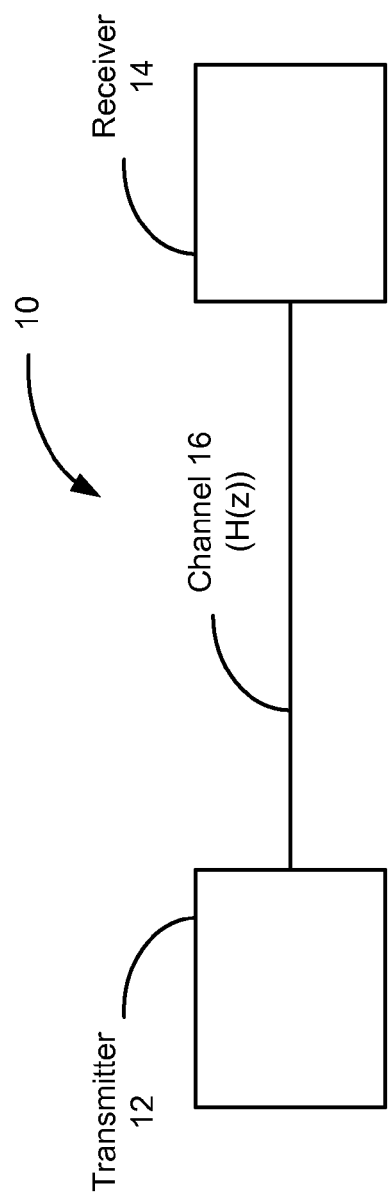
FIG. 1A illustrates a block diagram of a transmission system on a printed circuit board.
Figure 1B:
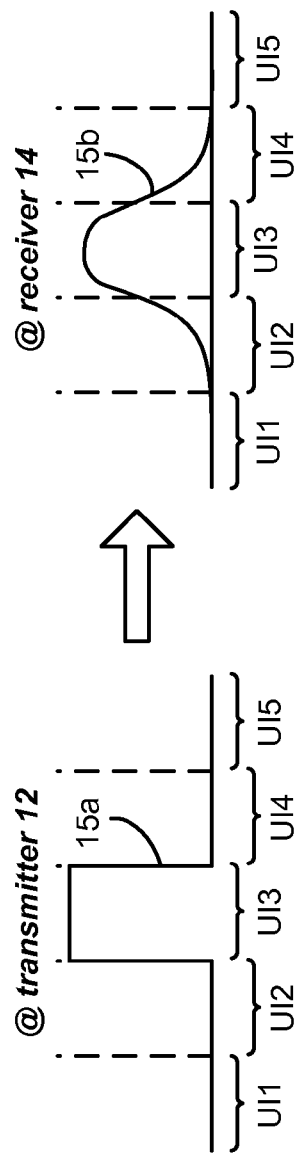
FIG. 1B illustrates the effect of a transmission channel on pulses sent across a channel.
Figures 2A, 2B:
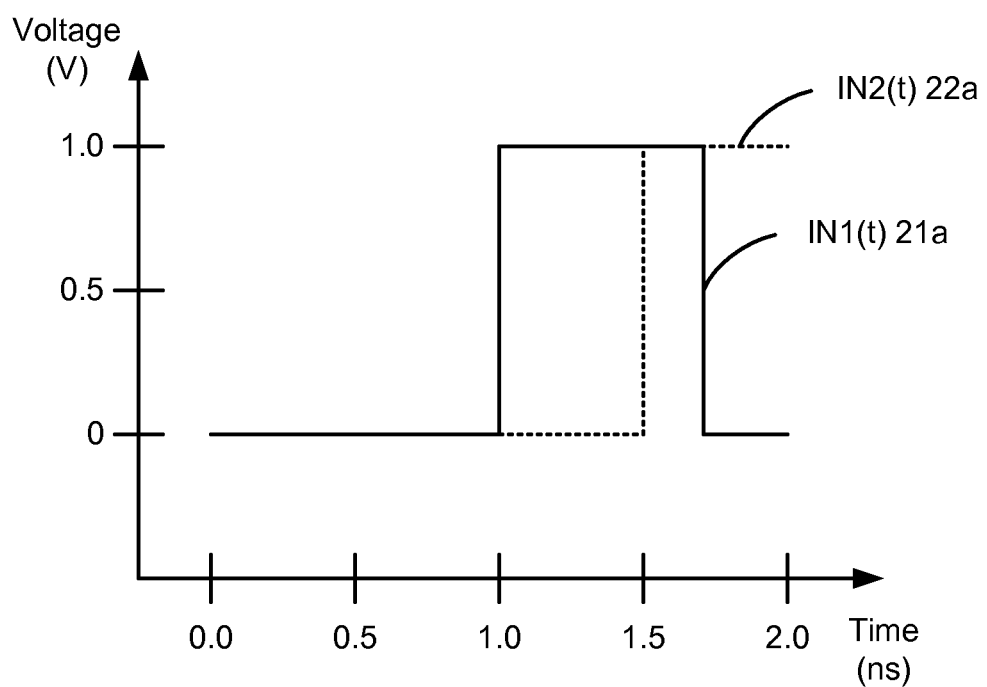
FIG. 2A is an illustration of time and voltage values for PWL functions.
FIG. 2B illustrates a graph of the two PWL functions of FIG. 2A.
Figure 3A:
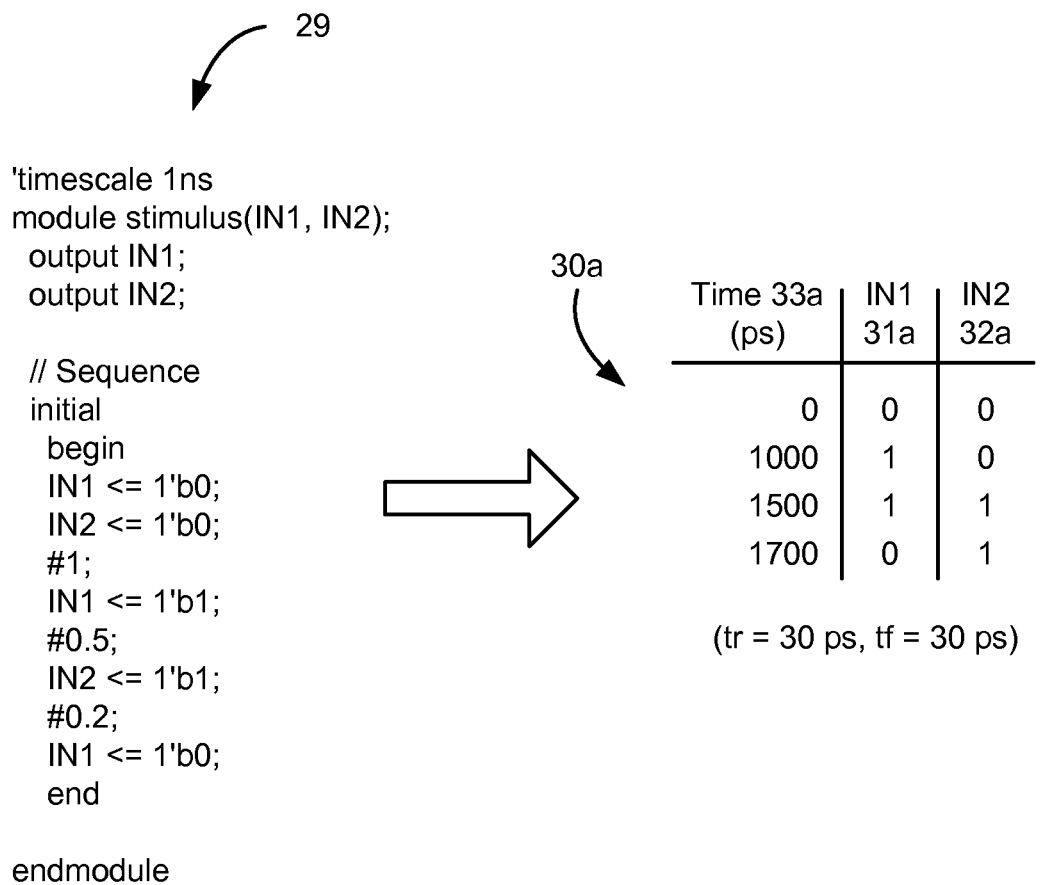
FIG. 3A illustrates a digital input vector used in one or more embodiments according to the invention, and time and voltage values for the PWL functions in the digital input vector, adjusted to a time scale used in accordance with one or more embodiments of the invention.

FIG. 3A shows the contents of a file containing a digital input vector 29 and a table 30a representing two parallel data signals obtained from the digital input vector 29. Such signal information may be contained in, for example, a file containing sparse PWL voltage versus timing information, such as an HDL-format file used in Verilog. As seen in FIG. 3A, the file contains a digital input vector 29, which contains several nanosecond time values (e.g., "#1"), which indicate differences in time between transitions in a signal. The following statements (e.g., "IN1<=1'b0") assign logic values associated with each transition, that is, after a time value, one or more signals transition from one logic value to another logic value. The signal information obtained for each data signal typically contains signal voltage and timing information, and may additionally contain rise times and fall times of transitions of the data signal. If the digital input vector 29 does not contain a rise time or a fall time, such values may be assigned default values, as is the case in table 30a of FIG. 3A, where a default rise time (tr=30 ps) and a default fall time (tf=30 ps) are assigned. The timing information may describe, for example, a plurality of timing values, with each timing value denoting a difference in time between subsequent transitions in a signal. The voltage information may, for example, be logic values associated with the transitions. The timing information in table 30a applies to both of the data signals IN1 31a and IN2 32a, and the data signals IN1 31a and IN2 32a may represent any form of data, as mentioned above, including, for example, instructions, memory addresses, random data, etc. While each data signal may be mapped to separate timing information (e.g., separate timing vectors), as shown, because of the nature of the signal information received from a program such as Verilog, each signal vector may also be mapped to a single timing vector.

In FIG. 3A, the timing information in table 30a, interpreted from digital input vector 29 has been modified such that the time scale 33a is in picoseconds. In other words, each of the transitions shown in table 30a occurs at the same time as shown in digital input vector 29, but the time scale 33a has been modified (i.e., 1.0 ns has been replaced by a time stamp of 1000 ps, 1.5 ns has been replaced by a time stamp of 1500 ps, etc.). Changing the time scale 33a will allow random timing variations (e.g., jitter) to be added in a consistent manner in the following steps. While in this example the time scale 33a has been changed from nanoseconds to picoseconds between the digital input vector 29 and the table 30a, such a conversion may be applied using any time scale. In summary, a digital input vector 29, containing sparse piecewise linear signal information, may be modified to form a first vector, shown in table 30a. The first vector has logic values 31a, 32a and associated time stamps, and each time stamp maintains the timing of the transitions in the signal.

As discussed briefly above, the signals IN1 31a and IN2 32a may be obtained in a number of manners, including extraction from Verilog or other HDL input vector files. For example, the signals IN1 31a and IN2 32a may be obtained from a file containing sparse PWL voltage versus timing information, in addition to information related to a rise time of signal transitions and a fall time of transitions. It should be understood that numerous methods exist to parse a file to extract the timing information (e.g., using a simple program or script), and accordingly, these methods are not discussed in detail here. Further, the sparse PWL voltage versus timing file may also include the true binary voltage values of the logic values of the signals contained therein.

Further, while the operations that are described according to various embodiments of the invention may be described as originating from a piecewise signal representation, a signal representation in another format may be obtained and converted to a format convenient for use with one or more embodiments of the invention. For example, a vector file may be obtained having more information than transitions (e.g., signals including more detailed voltage and timing information, but at a coarse time interval such as every 5 ns, and/or built in rising and falling transitions of finite length), and may be modified to have a time scale consistent with the discussion of FIGS. 3A-4K.

Additionally, while the use of vectors for the time and the signal vectors IN1 31 and IN2 32 is discussed, it should be understood that numerous other representations and forms are possible. For example, the sparse PWL voltage versus timing information may be parsed such that a matrix is formed with transition timing information contained in one column (or row) of the matrix, and the logic values of all corresponding signals in the remaining columns (or rows). In other words, multiple signal values may map to a single time vector. Operations on such a matrix may be performed, for example, in Matlab, and are understood by one of ordinary skill in the art. Thus, the operations described in relation to vectors could be similarly applied to one or more columns or rows of a matrix. Matlab is primarily discussed as a tool for vector and matrix operations; however, numerous other programs with similar vector and matrix capabilities are available, and may also be used.

Figures 3B, 3C:
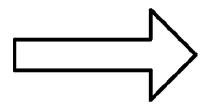
FIG. 3B illustrates time and voltage values for PWL functions, as well as jitter values by which the time and voltage values are modified.
FIG. 3C illustrates time and voltage values for the PWL functions of FIG. 3B pursuant to one or more embodiments of the invention, as well as a digital input vector resulting from the time and voltage values.

FIG. 3B shows a table 30b illustrating a process by which timing jitter is added to each transition of the signal vectors IN1 31b, IN2 32b. Table 30b represents the signal timing and voltage information shown in FIG. 3A, but the time vectors are now individually labeled for reference (e.g., as Time1 33b and Time2 34a) and to allow for independent modification of each time vector that corresponds to a signal vector. As can be seen in FIG. 3B, each time vector (33b, 34a) will be modified relative to the vectors shown in FIG. 3A. Specifically, the elements of the time vectors 33b, 34a may be modified by desired amounts, represented by jitter elements in a jitter vector 35a, 36a. Each jitter vector 35a, 36a is added to the respective time vector 33b, 34a. The jitter vector elements are located so as to correspond to a transition in the signal vectors IN1 31b, IN2 32b, (indicated, for example, by positive or negative time values in the jitter vectors IN1 35a, IN2 36a).

In other words, the first vectors IN1 31a, 32a will be modified to create second vectors IN1 31c, IN2 32c, where each transition is now associated with a second time vector 33c, and where each second time stamp is time-shifted from the first time stamps. Thus, after the addition of timing jitter, the transition times of 1,000 ps, 1,500 ps, and 1,700 ps occur at the times of 996.8 ps, 1,501 ps, and 1,698 ps, as shown in FIG. 3C. Of course, the time vectors 33b, 34a must be carefully modified with the jitter vectors 35a, 36a such that each element of the new time vector 33c corresponds to the appropriate addition of jitter.

The results of the operations in FIG. 3B are shown in FIG. 3C. In FIG. 3C, a table 30c of the signal vectors IN1 31c and IN2 32c is shown with the timing jitter introduced in FIG. 3B. In the table 30c, the time vectors 33a and 34a, modified by the jitter vectors 35a and 36a, have been recombined into a single time vector, containing the time stamps of all the transitions of signal vectors 31b and 32b. Then, these vectors are used to derive a simulatable vector 50a. The simulatable vector 50a corresponds in format to the digital input vector 29, but the time values now denote the time between the second time stamps of the second time vector 33c. To accommodate for the fractional time e.g., of the transition at 996.8 ps, the time scale has been changed to 100 femtoseconds (fs) in the simulatable vector 50a.

The added timing jitter may take on a number of forms (e.g., Gaussian jitter), and may additionally have any resolution determined useful for the purposes of simulation of the signal vectors IN1 31c and IN2 32c. Thus, while the resolution of the timing jitter shown in table 30c is 1 ps, and in the simulatable vector 50a is 100 fs, it should be understood that the timing jitter may have a smaller or a larger timing resolution. In one embodiment, where the transitions of multiple data signals are mapped to a single timing vector, it may be prudent to choose a time step of modest length (e.g. 1.0 ps), and map the time-varied (i.e., jittered) transitions into the resulting picosecond bins. In another embodiment, where independent time and voltage vectors are used to represent each data signal, it may be more appropriate to allow for more precise timing (e.g., jitter shorter than 1.0 ps). While particular jitter values are used at each signal transition, as shown in FIGS. 3B and 3C, it should be apparent from the basis of this disclosure that these jitter values may be modified as desired by a system designer. In other words, while the jitter-modified time vector shown in FIG. 3C has been modified by picosecond multiples as well as a fractional amount of 1 ps, the jitter vectors may comprise larger or smaller values by adjusting the time scale of the time vector, providing a more coarsely or more finely detailed time vector. Thus, in summary, the transitions associated with the time vectors (Time, Time1, Time2) and the signal vectors (IN1, IN2) may be time-shifted and output as differences in time with corresponding logic values associated with the time-shifted transitions.

In order to remain compatible with other programs such as Verilog, in one or more embodiments according to the invention, the various parallel signals are mapped to a single time vector, as shown in table 30c. Thus, as discussed with reference to FIG. 3C, the time vector and the signal vectors IN1 31c, IN2 32c may be mapped to a single vector to be compatible with various simulation programs, including, for example, Verilog. As discussed above, one or more PWL signals in Verilog are represented by a single vector file, which contains necessary timing and voltage information for each signal. After the jitter has been added to the voltage and timing information as discussed above, the voltage and timing information may be returned to its original format (e.g., a digital vector file 50a, shown in FIG. 3C, suitable for Verilog-based simulation), or additional operations may be performed on the voltage and timing information. In summary, a simulatable vector may be generated with logic and corresponding timing values, from one or more signal vectors, where the timing values in the simulatable vector represent time-shifted differences in time between transitions. Numerous modifications in this manner are possible, because certain features which may be desirable to add to the voltage and timing information for a given software program format may not be suitable for another program. For example, while the Verilog vector file does not incorporate rise and fall time information directly into the sparse PWL transition information, rise and fall time information may be stored as independent variables in the Verilog file and incorporated as the Verilog-based signals are applied in simulation.

On the other hand, it may be more appropriate to incorporate the rise and fall time information directly into the more detailed PWLs derived through the techniques presented herein. Further, in some applications it may become beneficial to incorporate additional modifications into the voltage and timing information, as detailed below. In the following FIGS. (4A-4K), additional modifications of the time and signal vectors will be shown. However, it will become apparent that certain methods may be performed regardless of the representation of the voltage and timing information available. Discussion of FIGS. 4A-4K begins with the digital input vector 29 shown in FIG. 4A. The processes for parsing the file and adding timing jitter is essentially the same as the discussion of FIGS. 3A-3B, and thus will only be briefly discussed here.

Figure 4A:
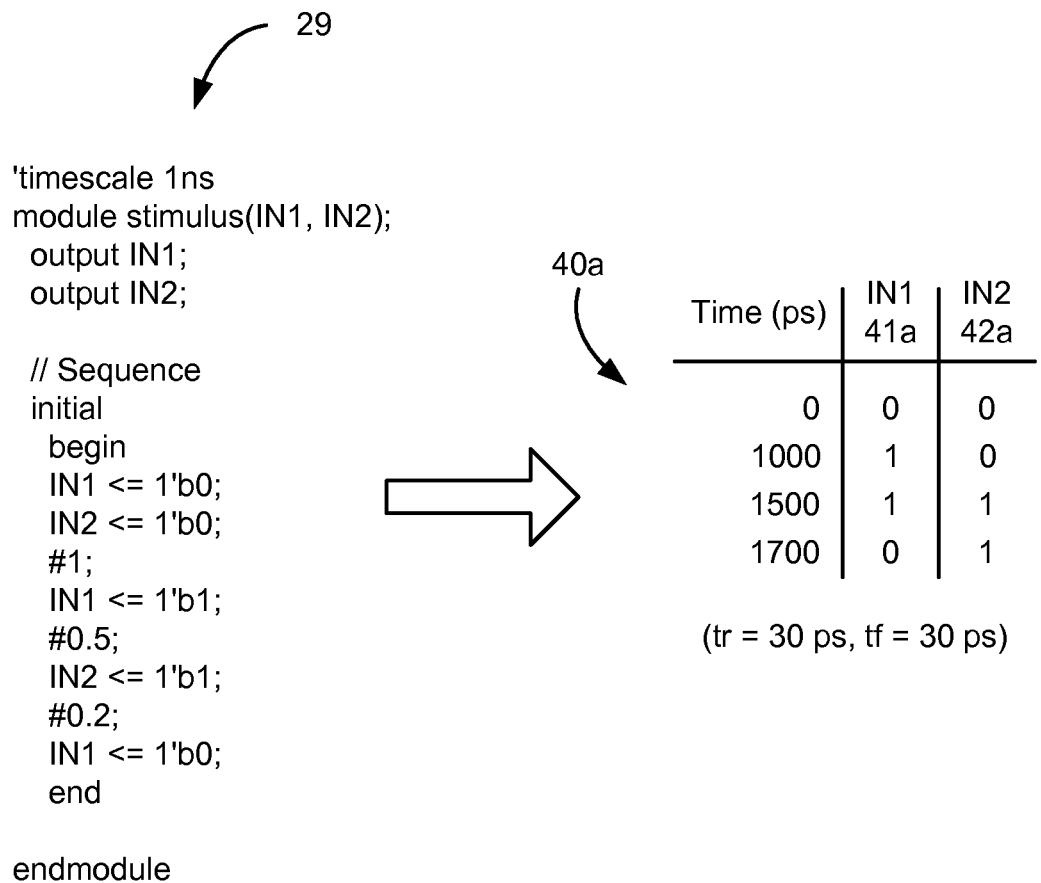
FIG. 4A illustrates the digital input vector and time and voltage values for the PWL functions in the digital input vector, as shown in FIG. 3A.

As shown in FIG. 4A, the digital input vector 29 is modified in the same manner as shown above, resulting in the table 40*a*, which includes information related to signals IN1 41*a* and IN2 42*a*, including the time stamps of the transitions of the signals IN1 41*a* and IN2 42*a*. In other words, each element in the signals comprises a logic value associated with a time stamp, and each time stamp corresponds to one of the timing values in the file. As shown in FIG. 4B, the time vector is duplicated to produce two time vectors 43*a* and 44*a*, (i.e., one for each signal vector 41*a* and 42*a*). Jitter is added to the time vectors 43*a* and 44*a* using jitter vectors 45*a* and 46*a*. In other words, the transitions indicated by the first time stamps in the time vectors 43*a*, 44*a*, are time-shifted by timing jitter to create second time stamps in the second time vectors 43*b*, 44*b*.

As shown in FIG. 4C, each element in the signal vectors IN1 41*b* and IN2 42*b* is associated with a second time stamp in the time vectors time1 43*b* and time2 44*b*, such that each time stamp time-shifts a previous transition according to a timing jitter value in the jitter vectors 45*a* and 46*a*. Based on these operations, the table 40*c*, shown in FIG. 4C, may be derived. In the table 40*c*, the time stamps in the two time vectors 43*b* and 44*b* have been modified by jitter and reduced to contain only the jitterized time values, i.e., the time of a jittered transition. Thus, at each time in the vector 43*b* or 44*b*, a transition occurs in one of the signal vectors IN1 41*b* or IN2 42*b*.

Once timing jitter is added to each set of signal voltage and timing information, as shown in FIGS. 4A-4C, it becomes convenient to apply additional signal characteristics, including realistic rise and fall times, to the signal transitions represented by the changes in the vectors at the times of 996.8 ps, 1,501 ps, and 1,698 ps. The processes for adding realistic rise and fall times is discussed in greater detail in U.S. patent application Ser. No. 11/926,682 filed Oct. 29, 2007, and thus is not discussed in detail here. However, the processes will be briefly discussed as they pertain to the waveform vector W1 of the exemplary embodiment of FIGS. 4A-4K. Waveform vector W1 will be modified such that a simulatable vector is formed. Of course, one skilled in the art will appreciate on the basis of this disclosure that the disclosed methods may similarly be applied to other waveform vectors (e.g., waveform vector W2), but as the details of these operations will be similar to the modification of the waveform vector W1, they will not be discussed here. In brief, as shown in FIG. 4D, the processes for adding realistic rise times and fall times begins by creating a transition time vector 47*a*, corresponding to the time vector 43*b*, and a waveform vector W1 48*a*, corresponding to the signal vector IN1 41*b*.

Three transition times 37*a*-37*c* are referenced in the transition time vector Vt 47*a*, with each transition centered at one of the jitter-modified times of 996.8 ps and 1,698 ps. The time values of 996.8 ps and 1,698 ps now reflect midpoints of what will become 30 ps transitions (37*d*, 37*e*, 37*f*) in the waveform vector W1 48*a*. Thus, each of the former transitions will be modified to represent a more realistic 30 ps transition (i.e., with an actual rise time or fall time). While the rise or fall time of each transition is assigned a value of 30 ps in this exemplary embodiment, this value could be varied as desired.

To create a simulatable vector from the signal vector IN1 41*b* in accordance with the disclosed technique, a waveform vector W1 48*a* is created, which contains the voltages of the transition midpoints from the signal vector IN1 41*b*. The magnitudes of the voltages of the transition midpoints can be determined in one implementation as the average of the voltages of the bits on either side of a given transition. Thus, in the depicted implementation, because ideal voltages of 0 and 1 are assumed for the bits, all transition midpoints have a midpoint voltage of 0.5V.

In the depicted embodiment, transition midpoints are created, and represented in waveform vector W1 48*a*, even if no transition actually occurs in the signal vectors IN1 41*b* and IN2 42*b*. So, representing this transition midpoint is therefore optional in some implementations of the disclosed technique. However, for ease in processing, and as shown, it can be easier to designate the boundaries between all bits as transition midpoints, and then deal with the reality that some may not actually be transitions later in the process.

Once the transition time vector 47*a* and the waveform vector W1 48*a* are formed, it becomes convenient to upscale these vectors. Upscaling is a process which adds additional points to the time vector 43*b* and the signal vector IN1 41*b* to form new vectors (e.g., Vt 47*a*, W1 48*a*, as shown in FIG. 4D). Upscaling may be accomplished on nearly any computer software program capable of modifying vectors (e.g., Matlab, Microsoft Excel, etc.), which programs may or may not be associated with the simulation software that will ultimately be used to simulate the vector the method creates.

The additional points added as a result of upscaling are illustrated in the vectors Vt 47*a* and W1 48*a* of FIG. 4D as highlighted by dotted line boxes. These additional points simply receive a placeholder value (e.g., 0), although other default values could be used as well. The additional points will, in subsequent steps, be modified to represent the corners of rising or falling transitions, with certain points indicating the beginning of such transitions, and other points indicating the ending of such transitions.

As illustrated in FIG. 4D, the timing vector is jitterized prior to upscaling. However, upscaling and jitter addition could occur in reverse order, with either order rendering the vectors Vt 47*a* and W1 48*a* of FIG. 4D. Further, as discussed above, a jitter vector may be created and added to a time vector to produce a jitter-modified time vector. However, timing jitter may be added in a number of manners, and may be added independent of the upscaling process. For example, timing jitter may be added to signal voltage and timing information by modifying one or more signal vectors on an element-by-element basis. In one or more embodiments according to the invention, each signal vector receiving timing jitter is modified at the signal vector elements corresponding to the times of the transitions and the amount of jitter to be applied. In other words, the signal vector is modified, on an element-by-element basis, to correspond to a different point in time. In this manner, the time vector corresponding to one or more signal vectors may be regarded as a constant, and the time of a given transition may be shifted by any number of corresponding time units.

Figures 4E, 4F:
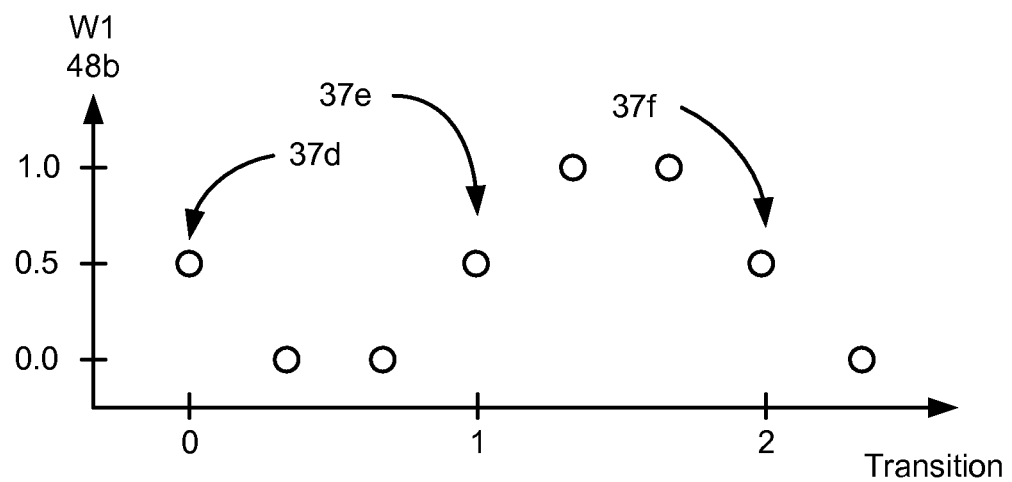
FIG. 4E illustrates modifications to the upscaled jittered transition voltage vector to reflect realistic voltage values in light of the bit sequence.
FIG. 4F illustrates a graph of the voltage values of FIG. 4E.

Once the basic upscaled vectors Vt 47*a* and W1 48*a* are formed, the additional points in the vector W1 84*a* are provided with realistic voltage values instead of placeholder values. This is illustrated in FIGS. 4E and 4F. The realistic voltage values are provided by the signal vector IN1 41*b* of FIG. 4C, which inform as to the magnitude of the voltages of the various bits between the transitions. For example, the bits between transitions 37*e* and 37*f* in the waveform vector W1 48*b* have voltages of 1.0V. (Compare FIGS. 4D and 4E). Therefore, upscaled points are updated in new waveform vector W1 48*b* with the appropriate value of 1.0 V.

Now that the vector W1 48*b* has been adjusted to include appropriate voltage values in light of the signal vector IN1 41*b*, the next step in the disclosed technique involves modification of the timing vector, which has otherwise remained unchanged since being jittered and upscaled. Actually, these adjustments to the timing vector (FIG. 4G) can be made concurrently with the adjustments to the transition vector just described (FIGS. 4D-4F). However, such adjustments are shown serially for ease of illustration.

The default timing values for the additional points (0) are adjusted to realistic values to match the basic shape of the signal vector IN1 41*b*. This requires some knowledge or assumption as to the shape of the transition edges of the signal vector IN1 41*b*, such as is provided by the rise time Tr and the fall time, Tf. Knowing these values, the timing of the additional points in the timing vector can be extrapolated using the timing (actually, jittered timing) of the midpoints 37*a*-37*c*. For example, assume the rise time Tr and the fall time Tf both equal 30 picoseconds (ps). From these values, appropriate values for the additional points in timing vector can be extrapolated. For example, the first additional point following point 37*a* represents the end of a falling transition; therefore half of the falling time Tf (15 ps) is added to the timing of transition midpoint 37*a* (0 ps), resulting in a value of 15 ps. Similarly, because the following '0' value (before point 37*b*) represents the beginning of a rising transition, half of the rise time Tf (30 ps) is subtracted from the timing of transition midpoint 37*b* (996.8 ps), resulting in a value of 982.8 ps. When these values are populated into a new timing vector Vt 47*c*, as shown in FIG. 4G, the results are an upscaled jittered transition timing vector Vt 47*c*, which accompanies upscaled jittered waveform W1 48*d*.

Figure 4H:
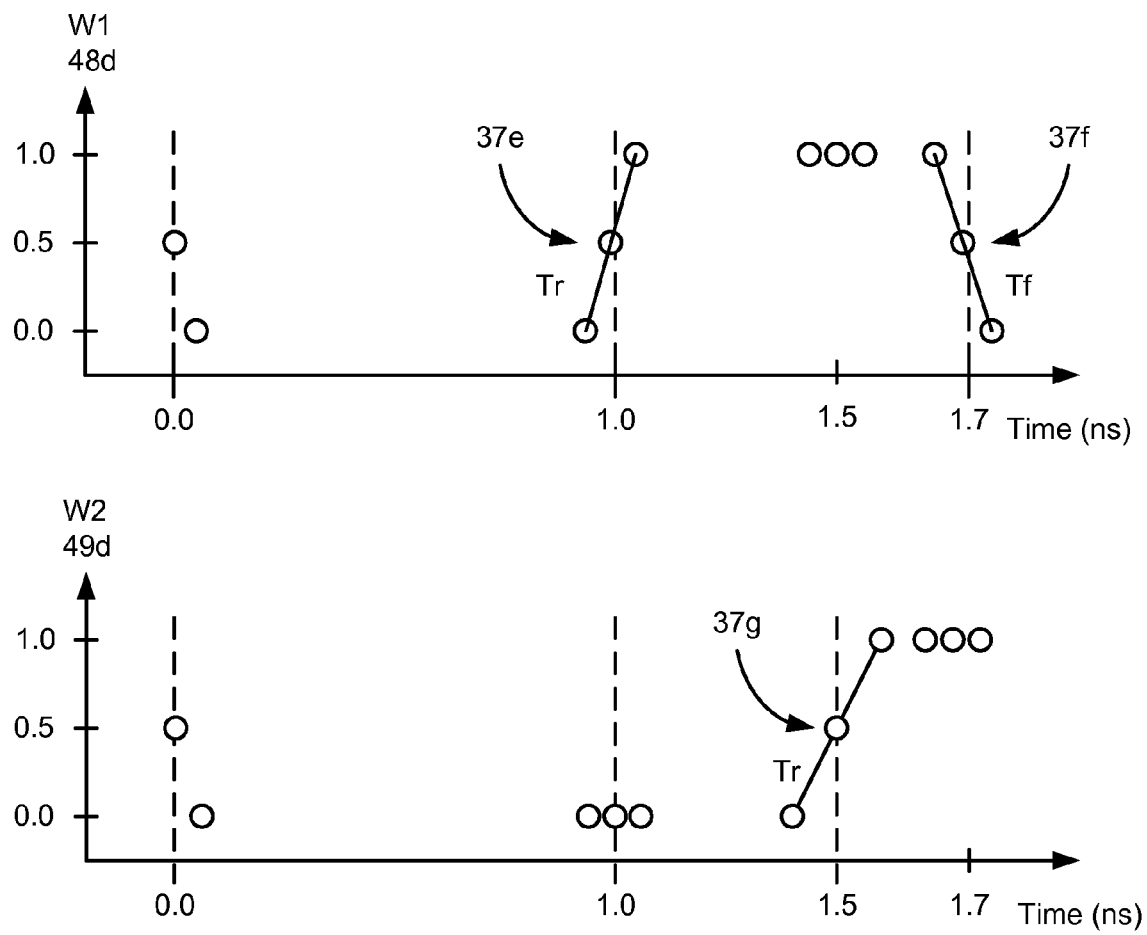
FIG. 4H illustrates the upscaled jittered transition timing vector and upscaled jittered transition voltage vectors, as well as corresponding graphs of these time and voltage values.

At this time, it becomes possible to concatenate any time vectors (e.g., Vt) into a single time vector, and interpolate any waveform vectors (e.g., 48) to accommodate for transitions introduced by the single time vector, for ease in simulation and graphing. FIG. 4H shows a time vector Vt 47*d*, as well as two waveform vectors W1 48*d* and W2 49*d*. As can be seen in FIG. 4H, the single time vector Vt 47*d* has been modified to combine all of the transitions shown in FIG. 4C, with the addition of jitter, as discussed in FIGS. 4D-4G. Similarly, waveform vectors W1 48*d* and W2 49*d* are the waveform vectors resulting from all of the transitions shown in FIG. 4C.

In other words, the waveform vectors W1 48*d* and W2 49*d* have been interpolated to include each others transitions, so that they may be graphed in accordance with a single time vector 47*d*. These vectors, as is apparent when graphed in FIG. 4H, represent all significant changes in the signal vectors IN1 41*b* and IN2 42*b* to be simulated. For example, it is now clear that the waveform W1 48*d* rises from 0 V to 1 V at a time of 981.8 ps, and ends this transition 37*b* at a time of 1011.8 ps. At 1683 ps, this waveform begins to fall to 0.0V, and the transition is complete at a time of 1713 ps, etc.

Each of the transitions 37*e*-37*g* is centered at 996.8 ps, 1,501 ps, and 1,698 ps, respectively. For additional convenience, the logic values of '0' and '1' are scaled to voltage values of 0.0 V and 1V, but it should be understood that the logic values may be scaled to any desired voltage used in simulation. Further, the logic values may be scaled to one or more voltage values of an analog signal. Thus, as discussed above with respect to FIG. 4G, at a time of 982 ps, the signal vector W1 48*d* begins a transition 37*a* from a steady-state 0.0 V to 1.0 V. Over the course of the following 30 ps (i.e., from 982 ps to 1012 ps), the signal vector W1 48*d* transitions from 0.0 V to 1.0 V, and the signal vector W1 48*d* completes the transition 30 at 1.0 V at a time of 1012 ps. Similarly, at a time of 1486 ps, the signal vector W2 49*d* begins a transition 37*g* from a steady-state 0.0 V to 1.0 V, and at a time of 1683 ps, the signal vector W1 48*d* begins a transition 37*f* from a steady-state 1.0 V to 0.0 V. These transitions end at a time of 1516 ps, and 1713 ps, respectively. In summary, FIGS. 4D-4H show a method for shaping transitions in accordance with realistic rise times and fall times for the transitions.

Figure 4I:
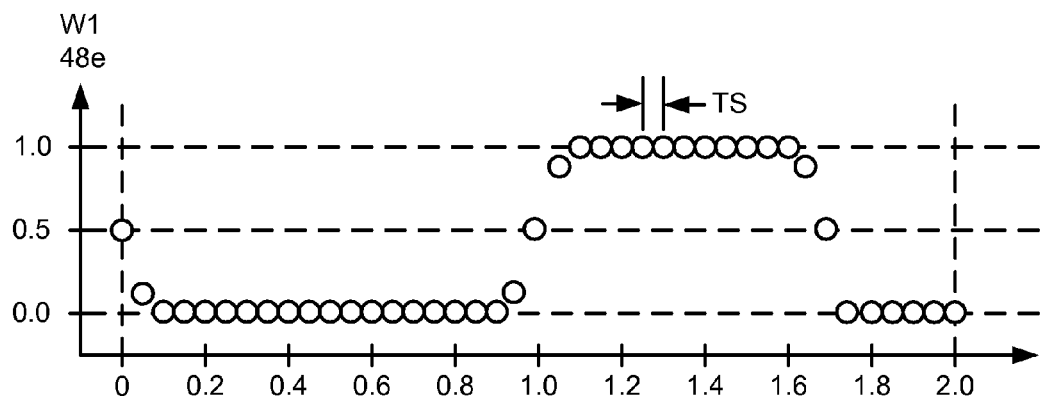
FIG. 4I illustrates a re-sampled vector suitable for simulation.

At this time, additional operations may be performed on the waveform vectors W1 48 and W2 49. Although the following operations are discussed only with reference to waveform vector W1 48, it will be apparent, on the basis of this disclosure, that similar operations may be performed for waveform vector 49. After the upscaled jittered transition timing vector Vt 47*d* and the upscaled jittered waveforms 48*d* and 49*d* are completed, these vectors can be re-sampled on a time step basis to form new vectors (e.g., waveform vector W1 48*e*, as shown in FIG. 4I). Resampling of the vectors in this manner may be performed to produce a simulatable vector W1 48*e* having samples spaced at a desired time step (TS) (i.e., interval) and filtered to eliminate the piecewise nature of the signals that resulted from the insertion of rising and falling transitions. Such a time step may be user-specified, or may be dictated by the simulation software for which the simulatable vector W1 48*e* is prepared. In one embodiment, the time step is able to maintain the jitter resolution of the smallest unit of time resolvable in the jittered timing vectors (e.g., for femtosecond jitter, the time step may be 1-5 ps, which maintains the jitter resolution after resampling), which usually results in a vector with enough detail to simulate a high speed, high frequency signal. However, a much larger time step of 0.05 ns is used in FIGS. 4I-4J to better illustrate use of the technique. The sampling operation may be performed using a number of standard software programs, including, for example, Matlab, which uses interpolative methods, as is well known. In short, sampling provides a simulatable vector W1 48*e* indicative of the bit stream, but with jitter added thereto, and which is ready for input into a simulation program. Filtering of the signal vectors W1 and W2 may be performed in a number of manners. For example, Matlab may be used to smooth out the corners introduced by the transitions, using known filtering algorithms including, for example, Butterworth filtering.

Figure 4J:
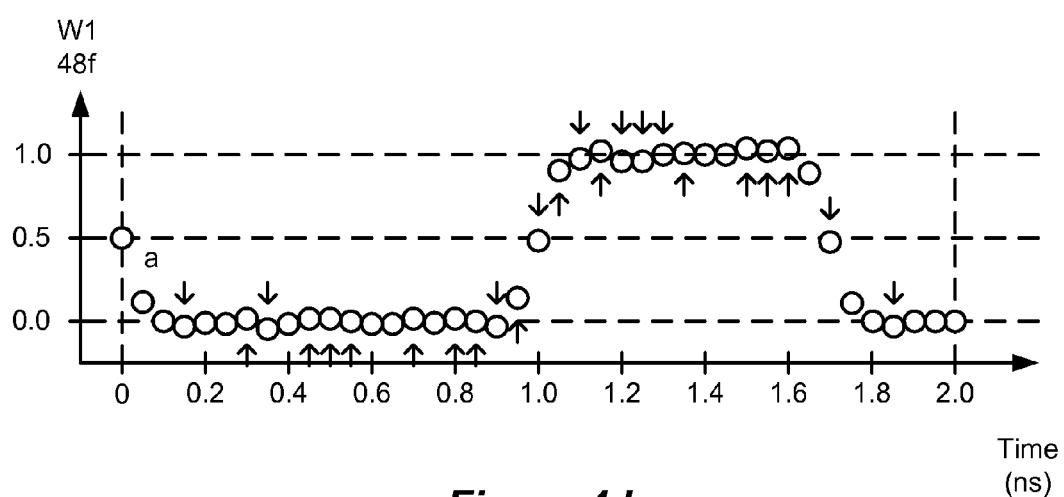
FIG. 4J illustrates the addition of amplitude noise to the vector of FIG. 4I.

After the vectors W1 and W2 are sampled for formatting on a time step basis, other operations may be performed. For example, as shown in FIG. 4J, amplitude noise may be added to the simulatable vector W1 to produce a noise-modified simulatable vector W1 48f. As its name implies, such noise perturbs the amplitude of the elements in the vector, which noise can include Gaussian distributed noise, sinusoidal distributed noise, or other forms of noise (e.g., aperiodic). Amplitude noise, like timing jitter as discussed earlier, may be defined in terms of a probability density function (PDF). Further, periodic noise that is added to the signal vectors W1 and W2 need not be limited to a single unit interval. For example, sinusoidal noise may be added to the signal vector W1 48e such that the period of the noise is longer than a single UI. It is also possible to vary the order of the filtering and noise application steps. For example, if a Gaussian distributed noise is applied following the filtering operation, the bandwidth of the noise is considered infinite, and thus represents "white" noise. When the noise is added prior to the filtering operation, the noise will also be filtered or "colored" by the filtering, which may be a better representation of the noise in some systems. In FIG. 4J, the noise-modified voltages are shown with arrows indicating the direction of noise-induced perturbation. Note also that such amplitude noise is easily added, and moreover is added independent of timing jitter. Amplitude noise can also be added earlier in the process as well; however, adding jitter before resampling to a uniform time step will limit the frequency content of the noise. Accordingly, it may be preferable to resample to a uniform time step, and then add noise, as shown above.

Once the final signal vectors W1 and W2 (e.g., W1 48f) are ready for simulation, these vectors may be converted to formats suitable for use in various programs for simulation. In other words, one or more simulatable vectors may be derived from one or more signal vectors (e.g., W1 and W2) and the one or more timing vectors (e.g., Vt). For example, the signal W1 48f, which may have originated from a Verilog vector file, could be modified in a program such as Matlab, and then exported in a simulator-compatible analog format in the simulatable vector 50b (shown, in part, in FIG. 4K) to another program, such as ADS, HSIM, and/or HSpice, each of which are tools well-known to one of ordinary skill in the art. FIG. 4K shows a portion of a simulatable vector 50b in a simulator-compatible analog format representation of the signal W1 48f. Naturally, the values extend to the final time of 1,700 ps, and have transitions centered at the times of 996.8 ps, 1501 ps, and 1698 ps, as discussed above. Thus, the simulatable vector may include a plurality of timing values denoting time-shifted differences in time between transitions in the signal and/or waveform vectors and the logic values associated with those transitions. The output according to one or more embodiments of the invention may have the same format as the input i.e., be input and output as a digital or analog vector file, having the form of sparse PWL voltage versus timing information. Further, while digital and analog vector files compatible with Verilog are used as examples to illustrate one or more embodiments according to the invention, similar techniques may be applied to other signal information, such as that from ADS, HSIM, HSpice, and/or WaveformerPRO.

Further, while the above operations, including the concepts of interpolation, adding timing jitter, voltage value scaling, filtering, adding voltage noise, etc. are performed on the exemplary signals 31-36 and 41-46, a sub-combination of the above operations may be performed and the results output for simulation. Further, once the signal vectors IN1 31 and IN2 32 are deemed complete by a system designer (i.e., at any point in the above processes), the signal vectors may be re-sampled to a preferred time scale (e.g., 10 ps), if necessary, and output for use in simulation.

Figure 5:
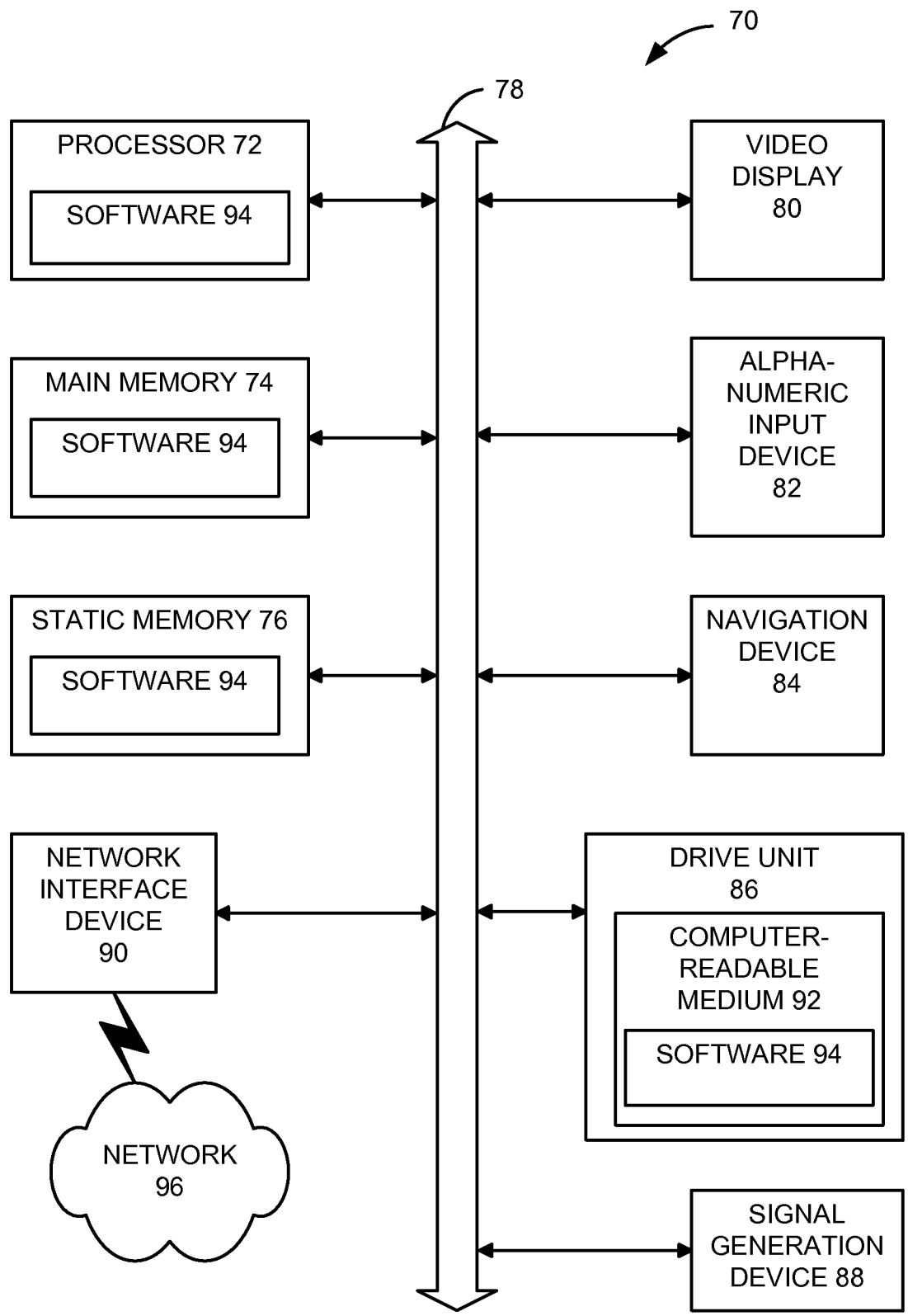
FIG. 5 illustrates a computer system in which embodiments of the disclosed techniques may be implemented, and illustrates one or more embodiments of the techniques in computer-readable media.

FIG. 5 is a block diagram of an exemplary computer system 70 within which a set of instructions, for causing the machine to perform any one or more of the techniques described herein, may be executed. In alternative embodiments, the computer system 70 operates as a standalone device or may be connected (e.g., networked) to other computer systems. In a networked deployment, the system 70 may operate in the capacity of a server or a client machine in a server-client network environment, or as a peer machine in a peer-to-peer (or distributed) network environment. The computer system 70 may be a personal computer (PC), a workstation such as those typically used by circuit designers, a set-top box (STB), a Personal Digital Assistant (PDA), a cellular telephone, a web appliance, a network router, switch or bridge, or any machine capable of executing a set of instructions that specify actions to be taken by that machine, and networked versions of these.

The exemplary computer system 70 includes a processor 72 (e.g., a central processing unit (CPU), a graphics processing unit (GPU) or both), a main memory 74 and a static memory 76, which communicate with each other via a bus 78. The computer system 70 may further include a video display unit 80 (e.g., a liquid crystal display (LCD) or a cathode ray tube (CRT)). The computer system 70 also includes an alphanumeric input device 82 (e.g., a keyboard), a user interface (UI) navigation device 84 (e.g., a mouse), a disk drive unit 86, a signal generation device 88 (e.g., a speaker) and a network interface device 90.

The disk drive unit 86 includes a computer-readable medium 92 on which is stored one or more sets of instructions and/or data structures (e.g., software 94) embodying embodiment of the various techniques disclosed herein. The software 94 may also reside, completely or at least partially, within the main memory 74 and/or within the processor 72 during execution thereof by the computer system 70, the main memory 74 and the processor 72 also constituting computer-readable media.

The software 94 and/or its associated data may further be transmitted or received over a network 96 via the network interface device 90 utilizing any one of a number of well-known transfer protocols (e.g., HTTP). Further, aspects of the disclose techniques can employ any form of communication network. Examples of communication networks 96 include a local area network ("LAN"), a wide area network ("WAN"), and the Internet.

While the computer-readable medium 92 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the disclosed techniques, or that is capable of storing, encoding or carrying data structures utilized by or associated with such a set of instructions. The term "computer-readable medium" shall accordingly be taken to include, but not be limited to, solid-state memories, optical and magnetic media such as discs, and carrier wave signals.

Embodiments of the disclosed techniques can also be implemented in digital electronic circuitry, in computer hardware, in firmware, in special purpose logic circuitry such as an FPGA (field programmable gate array) or an ASIC (application-specific integrated circuit), in software, or in combinations of them, which again all comprise examples of "computer-readable media." When implemented as software, such software can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processors 72 suitable for the execution of a computer program include, by way of example, both general and special purpose microprocessors, and any one or more processors of any kind of digital computer. Generally, a processor will receive instructions and data from a read-only memory or a random access memory or both.

To provide for interaction with a user, the invention can be implemented on a computer having a video display 80 for displaying information to the user and a keyboard and a pointing device such as a mouse or a trackball by which the user can provide input to the computer. Other kinds of devices can be used to provide for interaction with a user as well. For example, feedback provided to the user can be any form of sensory feedback, such as visual feedback, auditory feedback, or tactile feedback; and input from the user can be received in any form, including acoustic, speech, or tactile input.

Although embodiments according to the invention are discussed with reference to particular examples, it should be understood that numerous variations of the disclosed techniques are possible. For example, voltage and/or timing information from multiple signals, or from a single signal, may be provided in the signal information. Further, although the signal information depicted, e.g., in FIG. 3A assumes a particular format, numerous other formats may also be interpreted, and the techniques according to various embodiments of the invention may be similarly applied.

As an advantage of the various disclosed techniques, signals may be generated for simulation with complete control over voltage noise and timing jitter characteristics. Further, signals may be generated with arbitrary timing jitter and voltage noise, preserving relationships that may exist between ISI and data-dependent jitter. It may be useful to develop full signals with noise and jitter due to the impact of ISI, and full signals may be developed in accordance with one or more embodiments of the invention.

It should be understood that the disclosed techniques can be implemented in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A method implementable in a computer system for generating a simulatable vector, comprising:
   providing in the computer system a first vector indicative of an input signal and having a first format, wherein the first vector comprises a plurality of first entries each corresponding to a transition in the input signal, each first entry comprising a first time difference between a current transition and a previous transition in the input signal and a logic value of the input signal at the current transition;
   converting in the computer system the first vector to a second vector having a second format different from the first format, wherein the second vector comprises a plurality of second entries, wherein each second entry comprises a first time stamp comprising an absolute time of a transition in the input signal and a logic value of the input signal at that first time stamp;
   converting in the computer system the second vector to a third vector having the second format, wherein the third vector comprises a plurality of third entries, wherein each third entry comprises a second time stamp and a logic value of the input signal at that time stamp, wherein the second time stamps comprise time-shifted transitions of the input signal and are time shifted from the first time stamps by one or more random timing variations; and
   converting in the computer system the third vector to a fourth vector having the first format, wherein the fourth vector comprises a plurality of fourth entries each corresponding to the time-shifted transition in the input signal, each fourth entry comprising a second time difference between a current time-shifted transition and a previous time-shifted transition in the input signal and a logic value of the input signal after the current time-shifted transition.

2. The method of claim 1, wherein the first vector further comprises rise time and fall time information for the transitions of the input signal.

3. The method of claim 1, wherein the logic values comprise voltage values.

4. The method of claim 1, wherein the resolution of the first time differences and the first or second time stamps is different.

5. The method of claim 1, wherein the one or more random timing variations varies randomly between each second time stamp.

* * * * *